United States Patent
Sundholm (10) Patent No.: US 12,378,085 B2
(45) Date of Patent: Aug. 5, 2025

(54) METHOD FOR CONVEYING MATERIAL AND MATERIAL CONVEYING ARRANGEMENT

(71) Applicant: Maricap Oy, Vantaa (FI)

(72) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 38 days.

(21) Appl. No.: 18/549,365

(22) PCT Filed: Feb. 24, 2022

(86) PCT No.: PCT/FI2022/050124
§ 371 (c)(1),
(2) Date: Sep. 7, 2023

(87) PCT Pub. No.: WO2022/189697
PCT Pub. Date: Sep. 15, 2022

(65) Prior Publication Data
US 2024/0150136 A1 May 9, 2024

(30) Foreign Application Priority Data
Mar. 8, 2021 (FI) .................. 20215248

(51) Int. Cl.
*B65G 53/24* (2006.01)
*B65F 5/00* (2006.01)
(Continued)

(52) U.S. Cl.
CPC .............. *B65G 53/24* (2013.01); *B65F 5/005* (2013.01); *B65G 53/36* (2013.01); *B65G 53/60* (2013.01);
(Continued)

(58) Field of Classification Search
None
See application file for complete search history.

(56) References Cited

U.S. PATENT DOCUMENTS

| 4,076,321 A | 2/1978 | Haight et al. |
| 5,465,822 A | 11/1995 | Dewoolfson et al. |

(Continued)

FOREIGN PATENT DOCUMENTS

| CN | 110386387 | 10/2019 |
| FI | 122683 | 5/2012 |

(Continued)

OTHER PUBLICATIONS

"International Search Report and Written Opinion for PCT Patent Application No. PCT/FI2022/050124", May 25, 2022, 15 pages.

(Continued)

*Primary Examiner* — Joseph A Dillon, Jr.
(74) *Attorney, Agent, or Firm* — DeLizio, Peacock, Lewin & Guerra LLP (57) ABSTRACT

An arrangement for a pneumatic material conveying system comprising a first material conveying system. The arrangement comprises a second material conveying arrangement comprising at least one second input point (200) for feeding a second material (M), a second separator device (10), a second conveying pipe (102) between the at least one second:point (200) and the second separator device (10), which second separator device (10) is operatively connectable into medium communication with a conveying pipe (100) of the first material conveying system along the pipe, in order to connect a suction or a pressure difference acting in the first pipeline (100) to act via the second separator device (10) in the second conveying pipe (201) to convey the second material (M) from the second input point (200) in the second conveying pipe (201) to the second separator device (10) configured to separate the second material (M) from transporting air flow, and to collect the material (M) into a collection container (11) of the second separator device (10).

26 Claims, 7 Drawing Sheets

(51) Int. Cl.
    *B65G 53/36*     (2006.01)
    *B65G 53/60*     (2006.01)

(52) U.S. Cl.
    CPC ............... *B65F 2240/1123* (2013.01); *B65G 2201/0244* (2013.01)

(56) References Cited

U.S. PATENT DOCUMENTS

| | | | |
|---|---|---|---|
| 6,634,833 B2* | 10/2003 | Gillespie | B65G 53/58 406/84 |
| 6,923,601 B2* | 8/2005 | Goth | B65G 53/42 406/152 |
| 7,278,804 B2* | 10/2007 | Deal | E21B 21/062 406/197 |
| 8,360,691 B2* | 1/2013 | Moretto | B65G 53/66 406/122 |
| 8,727,671 B2* | 5/2014 | Sundholm | B65F 5/005 406/198 |
| 8,992,133 B2* | 3/2015 | Sundholm | B65G 53/24 406/173 |
| 9,440,802 B2* | 9/2016 | Moretto | B65G 53/66 |
| 9,637,320 B2* | 5/2017 | Moretto | B65G 53/04 |
| 9,708,138 B2* | 7/2017 | Veselov | B65G 53/46 |
| 9,745,149 B2* | 8/2017 | Brewster | B65G 53/66 |
| 9,896,265 B2* | 2/2018 | Sundholm | B65F 5/005 |
| 9,937,651 B2* | 4/2018 | Zinski | B65G 53/66 |
| 10,144,597 B2* | 12/2018 | Zheng | B01D 21/267 |
| 10,407,256 B2* | 9/2019 | Roberge | B65G 53/42 |
| 10,442,620 B2* | 10/2019 | Sundholm | B65F 3/201 |
| 10,689,192 B2* | 6/2020 | Sundholm | B65G 53/60 |
| 10,773,886 B2* | 9/2020 | Sundholm | E04F 17/12 |
| 10,815,078 B2* | 10/2020 | Stark | B65G 53/60 |
| 10,906,757 B2* | 2/2021 | Kramer | B29B 9/16 |
| 11,059,212 B2* | 7/2021 | Maguire | B65G 53/66 |
| 11,066,255 B2* | 7/2021 | Kramer | B65G 53/40 |
| 11,091,327 B2* | 8/2021 | Kelly | B65G 53/04 |
| 2015/0191308 A1* | 7/2015 | Sundholm | B65F 1/1447 406/173 |
| 2021/0387802 A1* | 12/2021 | Sundholm | B65G 53/34 |
| 2023/0044045 A1* | 2/2023 | Sundholm | B65G 53/24 |

FOREIGN PATENT DOCUMENTS

| | | |
|---|---|---|
| FI | 124175 | 4/2014 |
| GB | 1564311 | 4/1980 |
| SE | 522770 | 3/2004 |
| WO | 2012059632 | 5/2012 |
| WO | 2014029903 | 2/2014 |
| WO | 2020084190 | 4/2020 |

OTHER PUBLICATIONS

"Office Action issued in priority Patent Application No. FI20215248", 9 pages.

"Search Report issued in priority Application FI20215248", Sep. 21, 2021, 2 pages.

* cited by examiner

METHOD FOR CONVEYING MATERIAL AND MATERIAL CONVEYING ARRANGEMENT

FIELD OF THE INVENTION

The invention relates generally to pneumatic material conveying systems, such as partial-vacuum transporting systems, specifically to the collection and transfer of material, such as to the transfer of industrial materials or domestic waste or recyclable material.

BACKGROUND OF THE INVENTION

Systems in which solid material, for example solid waste, may be conveyed in piping by means of suction and/or a transporting air flow are known. In such systems, material may be conveyed over long distances in the piping pneumatically by means of suction and/or a pressure difference typically together with transporting air. The apparatuses are used, among other things, for conveying material in various facilities, for conveying domestic waste or for conveying other waste. It is typical of them that a partial-vacuum apparatus is used to provide the pressure difference needed for transporting the material, in which partial-vacuum apparatus the negative pressure into the conveying pipe is provided by partial-vacuum generators, such as partial-vacuum pumps or an ejector apparatus. In the conveying pipe there is typically at least one valve member, by opening and closing which valve member the replacement air coming in to the conveying pipe is controlled. As a result, an air flow is provided into the conveying pipe, with which air flow the material may be conveyed. Also systems in which the pressure difference and/or the transporting air flow in the conveying piping may be provided for example by a blowing arrangement are known. One of the convenient solutions of new regional building projects is waste management operating on a pipe transporting system. This means that the sorted waste or material to be recycled is sucked through underground pipes to a waste management station common to the whole area. The system is a tidy, odourless and noiseless solution as well as environmentally friendlier and safer for the surrounding area than the traditional waste management. On the other hand, part of the waste is often such that it cannot be satisfactorily transported in the long piping because of its size or other quality.

The object of this invention is to provide a completely novel solution in connection with material conveying systems, by means of which the disadvantages of the known solutions will be avoided. Another object of the invention is to provide a solution in which some of the material is not necessarily intended to be transported over the whole distance in a long conveying pipe to a waste management station, but it is instead transported to a separately emptied collection container.

SUMMARY OF THE INVENTION

The invention is based on an idea of providing a pneumatic material conveying pipe in which suction and, by controlling the replacement air, a transport air flow may be arranged. According to one embodiment, the material conveying pipe may be a conveying pipe suitable for pneumatic transport, into which conveying pipe suction is arrangeable by partial-vacuum devices and a transport air flow is arrangeable by controlling the replacement air. A second material conveying arrangement may be connected to the material conveying pipe, along the pipe, i.e. along its length, which second material conveying arrangement utilizes the negative pressure provided in the piping of a first material conveying system.

The invention relates according to one embodiment to a method for conveying material in a conveying pipe pneumatically by means of suction, a pressure difference and/or a transporting air flow in a material conveying system.

The method according to the invention is characterized by features set forth in independent claim 1. The embodiments of the method of the invention are characterized by features set forth in the dependent claims. By arranging in connection with a first material conveying system a second material conveying arrangement utilizing the suction/negative pressure of a partial-vacuum generator of the first material conveying system, but wherein the material being transported may be conveyed from an input point along a separate conveying pipe to its own separating device into a container thereof, it is possible to provide an efficient solution for the transfer and collection of a second material. According to one embodiment, the components of the second waste conveying arrangement may also be better adapted in terms of their properties to the properties of the material conveyed in the second material conveying arrangement.

According to one embodiment, the material conveying system may comprise a first input point for feeding a first material, a first conveying pipe, at least one first separator device at an outlet end of the material conveying pipe as well as a partial-vacuum generator, a suction side of which may be connectable, for example via the first separator device, to the first conveying pipe. Additionally, the material conveying system may comprise means for opening and closing an access of replacement air to the conveying pipe, for conveying the material from at least one first input point in at least one first conveying pipe, to the first separator device. A negative pressure or a pressure difference relative to surrounding pressure may be provided in the conveying pipe by the partial-vacuum generator. In the method a second material conveying arrangement is provided, which second material conveying arrangement may comprise a second input point for feeding a second material, a second separator device, a second conveying pipe between at least one second input point and the second separator device, in which method the separator device of the second material conveying arrangement may be operatively connected into medium communication with the conveying pipe of the first material conveying system along the pipe, i.e. along its length, in order to connect the suction or pressure difference acting in a first pipeline to act via the second separator device in the second conveying pipe, whereby the second material may be conveyed from the second input point in the second conveying pipe to the second separator device where the second material may be separated from transporting air flow, and the second material may be collected into a collection container of the second separator device. This has, among other things, the advantage that the suction, negative pressure and flow of transporting air provided by the partial-vacuum generator of the first material conveying system may be utilized in the second material conveying arrangement. At the same time, the separator device and/or the input points of the second material conveying arrangement may be arranged to be operatively connected to the conveying pipe of the first material conveying system, but if desired, independently of the location of the input points and the separator device thereof. Additionally, the conveying pipe of the second material conveying arrangement may be adapted specifically to the second material intended to be conveyed therein.

Instead of or in addition to one of the above- or below-mentioned embodiments, the second conveying arrangement may comprise a separator device in which there is a collection container, a material and transporting air input aperture of which may be operatively connected by the second conveying pipe to the second input point in order to convey the material in the second conveying pipe from the input point into the collection container of the second separator device together with the transporting air flow, when an operative medium communication is formed from a transporting air output aperture of the separator device by a pipeline with the first conveying pipe, in order to connect the suction or pressure difference acting in a first pipeline to act via the second separator device in the second conveying pipe. Thereby the second material may be conveyed from the second input point in the second conveying pipe into the second separator container where the second material is separated from the transporting air flow, when access of replacement air to the second conveying pipe to an opposite side of the material being conveyed as seen from the second separator device in the direction of travel of the material is allowed.

Instead of or in addition to one of the above- or below-mentioned embodiments, the first material may be conveyed in the first conveying pipe from the first input point arranged directly or via a branch line along the pipe, or along its length, to the first pipeline and further to the at least one separator device arranged at an outlet end of the first conveying pipe, in which separator device the first material may be separated from the transporting air flow.

Instead of or in addition to one of the above- or below-mentioned embodiments, the second input point or the second conveying pipe may be provided with a valve for opening and/or closing and/or controlling the input of replacement air.

Instead of or in addition to one of the above- or below-mentioned embodiments, the medium communication between the first conveying pipe and the second separator device may be opened and closed by a valve.

Instead of or in addition to one of the above- or below-mentioned embodiments, in the method abrasive, i.e. wear-causing, second material (M), for example glass material, may be conveyed from the second input point in the second conveying pipe.

Instead of or in addition to one of the above- or below-mentioned embodiments, in the method second material, the properties of which may differ from the first material conveyed from the first input point in the first conveying pipe, may be conveyed from the second input point.

Instead of or in addition to one of the above- or below-mentioned embodiments, the second conveying pipe may be manufactured mainly from a different material than the first conveying pipe.

Instead of or in addition to one of the above- or below-mentioned embodiments, the second conveying pipe may comprise wear-resistant material, for example metal.

Instead of or in addition to one of the above- or below-mentioned embodiments, in the method the second separator device may comprise a collection container which is a so-called deep collection container.

Instead of or in addition to one of the above- or below-mentioned embodiments, the material collected into the collection container of the second separator device may be discharged into a container of a transporting vehicle or the container filled with the material may be replaced by an empty collection container and the container filled with the material may be taken by the transporting vehicle to another location for being emptied.

Instead of or in addition to one of the above- or below-mentioned embodiments, in the method the second separator device is a cyclone separator in its operating principle.

Instead of or in addition to one of the above- or below-mentioned embodiments, the second separator device is a deep collection container-separator device, the collection container of which may be lifted by lifting means and the material collected into the collection container may be discharged, for example via an openable and closable aperture arranged in its lower part.

According to another aspect, the invention relates to an arrangement for a pneumatic material conveying system. The arrangement is characterized by features set forth in claim 14. The embodiments of the arrangement are characterized by features set forth in the dependent claims.

The material conveying system may comprise a first material conveying system in which there may be at least one first input point for feeding a first material, a first conveying pipe, at least one first separator device at an outlet end of the first conveying pipe as well as a partial-vacuum generator, a suction side of which may be connectable via the first separator device to the first conveying pipe as well as means for opening and closing an access of replacement air to the conveying pipe, for conveying material from the at least one first input point in the first conveying pipe, to the first separator device, in which conveying pipe a negative pressure or a pressure difference relative to surrounding pressure may be provided by the partial-vacuum generator. According to one embodiment, the arrangement may comprise a second material conveying arrangement which may further comprise at least one second input point for feeding a second material, a second separator device, a second conveying pipe between the at least one second input point and the second separator device, which second separator device may be operatively connectable into medium communication with the conveying pipe of the first material conveying system along the pipe or along its length, in order to connect a suction or a pressure difference acting in the first pipeline to act via the second separator device in the second conveying pipe to convey the second material from the second input point in the second conveying pipe to the second separator device which may be configured to separate the second material from transporting air flow, and to collect the material into a collection container of the second separator device. According to one embodiment, the second material conveying arrangement may be a second material conveying system. According to one embodiment, the second material conveying arrangement may be an arrangement utilizing at least one partial-vacuum generator of the first material conveying system.

Instead of or in addition to one of the above- or below-mentioned embodiments, in the arrangement a pipeline may be arranged from an output side of the second separator device to the first conveying pipe and which separator device may be connectable from an input side by the second conveying pipe to the second input point.

Instead of or in addition to one of the above- or below-mentioned embodiments, in the arrangement the first input point and/or the second input point and/or the first conveying pipe may be provided with a replacement air channel and a valve for opening and/or closing and/or controlling the input of replacement air.

Instead of or in addition to one of the above- or below-mentioned embodiments, in the arrangement the second input point may be configured to receive and/or the second conveying pipe may be configured to convey and/or the separator device may be configured to receive abrasive, i.e. wear-causing, second material, for example glass material.

Instead of or in addition to one of the above- or below-mentioned embodiments, in the arrangement the second conveying pipe may be mainly of a different material than the first conveying pipe. The second conveying pipe may thus be adapted to the second material. This allows the first conveying pipe not having to be adapted to the second material, but instead it may be adapted for example to only fulfil the requirements of transfer of the first material. This may be economically a very significant feature, as the conveying distances may be rather long in the first material conveying system.

Instead of or in addition to one of the above- or below-mentioned embodiments, in the arrangement the second conveying pipe may comprise wear-resistant material, for example metal.

Instead of or in addition to one of the above- or below-mentioned embodiments, in the arrangement the second separator device may comprise a so-called deep collection container.

Instead of or in addition to one of the above- or below-mentioned embodiments, the second separator device may be a cyclone separator in its operating principle.

Instead of or in addition to one of the above- or below-mentioned embodiments, the second separator device may be a deep collection container-separator device, the collection container of which may comprise a lifting point from which the collection container is arranged to be lifted by lifting means, and the collection container may comprise an openable and closable aperture, via which the collection container may be emptied of collected material.

Instead of or in addition to one of the above- or below-mentioned embodiments, the arrangement may comprise a valve for opening and closing a medium communication between the first conveying pipe and the second separator device.

Instead of or in addition to one of the above- or below-mentioned embodiments, a plurality of second separator devices and second input points connected thereto by the second conveying pipes may be operatively connected along the first conveying pipe.

Instead of or in addition to one of the above- or below-mentioned embodiments, the first conveying pipe may be operatively connected with other components or subsystems utilizing suction of the first partial-vacuum generator acting via the first conveying pipe.

According to a third aspect, the invention may relate to a material conveying system. The material conveying system is characterized by features set forth in claim 26. According to one embodiment, the material conveying system may comprise one or more of the above- or below-mentioned embodiments. According to one embodiment, industrial materials and/or domestic waste and/or recyclable material may be conveyed by the first material conveying system and/or by the second material conveying arrangement. According to one embodiment, food industry materials or domestic waste are conveyed by the first material conveying system.

The solution according to the invention has a number of significant advantages. By means of the solutions of the invention the disadvantages of the prior art will be avoided. By using a deep collection container as the separator device, the material conveyed into the collection container may also be efficiently stored, and emptying of the container may be performed less frequently. Emptying of the collection container may be performed by lifting the collection container and by discharging the material collected into the container through an openable and closable aperture arranged in a lower part of the container for example into a container of a transporting vehicle, such as a waste collection vehicle. Alternatively, the container may be transported to another location for being emptied and the filled-up container may be replaced by an empty container. By means of the solution according to the invention, a separator device of a pneumatic material pipe transporting system and a temporary collection container intended for storage of transported material may be efficiently combined. When the collection container is a so-called deep collection container at least partly disposed below the ground surface level or a corresponding surface level, the need for space may be efficiently reduced. By arranging most of the volume of the collection container below the ground surface and only a relatively small portion as a visible part, a solution suited well to the surroundings will be provided as the collection container. Because of the large volume and dimensions of the container, the material collected into the container yields, i.e. compacts, whereby the collection container holds a relatively greater amount of material than multiple small containers. According to one preferred embodiment, the deep collection container-separator device comprises a collection container and an external container into which the collection container is arranged and from which the collection container is lifted for being emptied. The solution according to the invention is suitable for use in connection with many types of pneumatic material pipe transporting systems. When using a partial-vacuum generation apparatus to provide the necessary pressure difference and/or transporting air flow in the conveying piping, the partial-vacuum generation devices of a first conveying system may be used in connection with the material conveying system comprising a deep collection separator device of the invention to provide the negative pressure needed for pneumatic material transport. A plurality of second conveying arrangements may be arranged along the conveying pipe of the material conveying system. The system thus enables the effective operating time of the partial-vacuum source of a first material conveying system to be divided between a plurality of second material conveying systems. According to an embodiment of the invention, it may also be contemplated that the partial-vacuum source of the deep collection separator device or separator devices is for example an integral partial-vacuum pump apparatus of a larger system, by which partial-vacuum pump apparatus the air flow/negative pressure for conveying the material from the second input points to the second separator device is generated. This solution is particularly suitable for situations where there are multiple deep collection separator devices arranged along a conveying pipe of a larger system. The solution according to the invention provides the possibility to use an existing waste collection vehicle or the like for emptying the collection container of the deep collection separator device. The deep collection container-separator device according to the invention also provides a possibility to feed such material via an openable and closable input aperture formed in the collection container which is not, for example due to its size or other properties, suitable for being conveyed in a pneumatic material pipe transporting system. In the deep collection container-separator device according to the invention, the flow of transporting air in the chamber space or output channel of the separator device is controlled by providing a control effect for the transporting air in the opposite direction relative to its rotating direction. This way it is possible to provide a significant improvement in the material being separated not drifting with the transporting air towards the output channel. Thereby for example waste particles, such as paper or plastic films or bags, are not drawn into the output aperture of the separating device and/or do not block the output aperture, and a reliable deep collection container-separator device for a pneumatic waste conveying system may be provided. The desired effect may be produced by arranging the output coupling to the wall of the output channel in such a way that the flow of transporting air from the output channel to the output coupling is oriented in a mainly tangential direction relative to the wall of the output channel. This may be achieved for example be arranging the output coupling eccentrically to the output channel. The deep collection separator device according to the invention is suitable both for material conveying systems in which a formator, i.e. a rotary shaper, is used for compacting and/or shaping the material conducted from input points to the conveying piping, and for regular pneumatic material pipe transporting systems in which the material is fed from an input point directly to the conveying piping.

Inventive embodiments are also disclosed in the description and drawings of this application. The inventive content of the application may also be defined in a different way than as set forth in the following claims. The inventive content may also be comprised of several separate inventions, especially if the invention is considered in light of expressed or implicit subtasks or in terms of achieved benefits or benefit categories. In this case, some features of the following claims may be redundant for individual inventive ideas. The features of different embodiments of the invention may be applied in connection with other embodiments within the scope of the basic inventive idea.

LIST OF THE FIGURES

In the following, the invention will be described in more detail by way of example with reference to the accompanying drawings, in which.

DETAILED DESCRIPTION OF THE INVENTION

In some cases the features set forth in this application may be used as such, disregarding other features. On the other hand, the features set forth in this application may be combined, if necessary, to form various combinations.

The features presented in combination with other features in the following paragraphs may also be used separately, if necessary.

Some embodiments are illustrated in FIGS. 1-8.

An embodiment of a pneumatic material conveying system may be, according to one embodiment, a waste material or recyclable material collection and conveying system. In the pneumatic material conveying system, material may be conveyed from an input point 108 in a material conveying pipe 100 by means of a pressure difference in a transporting air flow to an outlet end of the material conveying system. At the outlet end the material being transported may be separated from the transporting air flow in a separator device 90A, 90B. The separator device may be for example a separator container. The pressure difference and transporting air flow needed for the transport of material may be provided for example by a partial-vacuum generator 121A, 121B, a suction side of which may be connected to act in the material conveying pipe 100. At the same time, replacement air may be conducted to the material conveying pipe.

Figure 1:
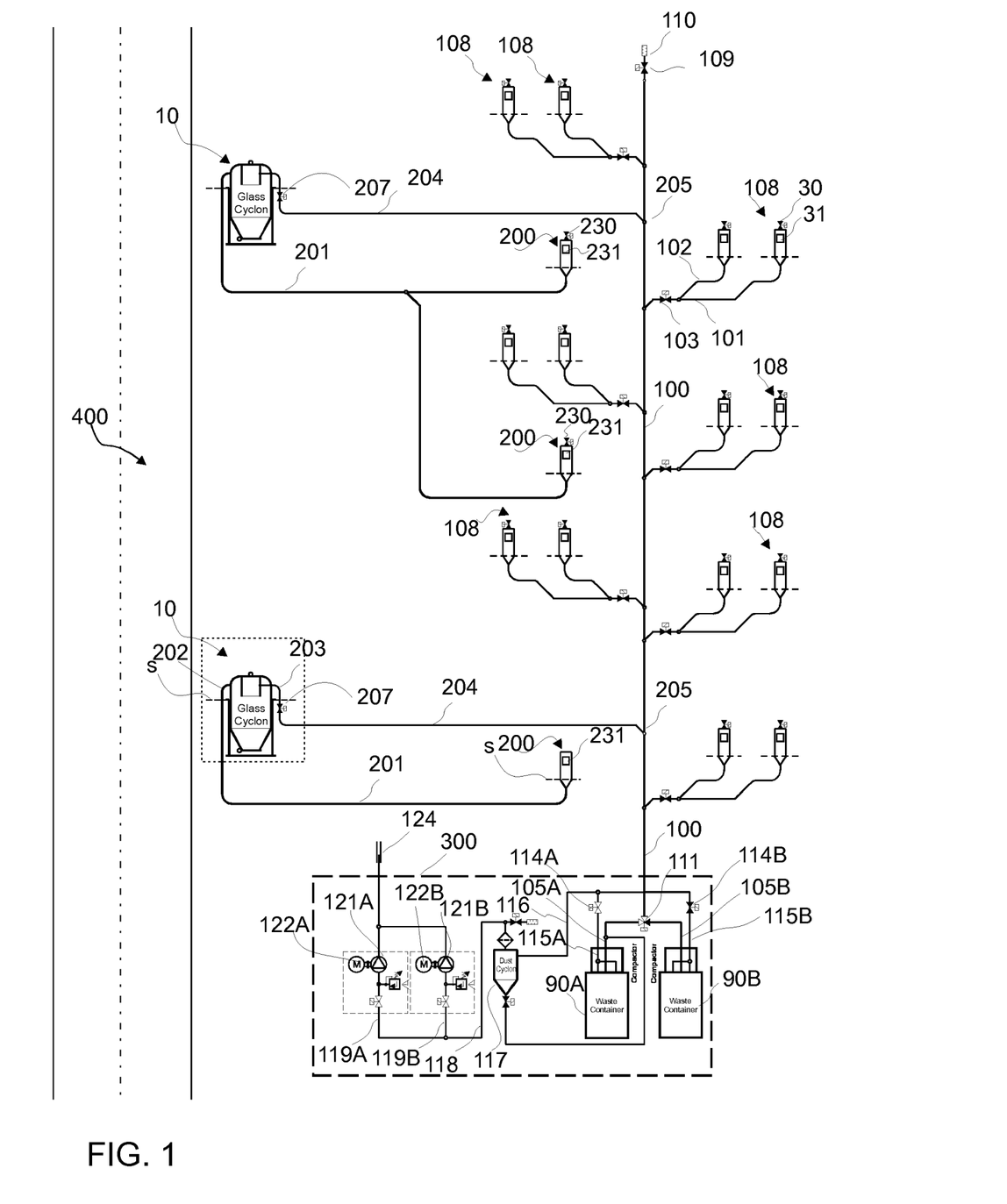
FIG. 1 illustrates a system according to one embodiment as a simplified diagram.

FIG. 1 schematically illustrates part of a pneumatic material conveying system in which there is a material conveying pipe 100 along which at least one, typically multiple input points 108 are arranged. The input point 108 may be an input station for material, specifically waste material, intended to be transported, from which input station the material, specifically waste material, such as domestic waste, or recyclable material, intended to be transported is fed to the conveying system. The input station 108 may also be a waste chute to which material is fed through input apertures located on different floors of a building. The system may comprise a plurality of input stations 108 from which the material intended to be transported is fed to conveying piping 100, 101. By opening and closing a closing member, such as a valve member 30, possibly provided in connection with the input station, the material may be conveyed from the input point 108 to the conveying pipe 100. The input point 108 may be connected to the conveying pipe 100 or to an input pipe 102 which is connected to the conveying pipe. Typically, the conveying piping may comprise a main conveying pipe 100 to which a plurality of branch conveying pipes 101 may be connected and to which branch conveying pipes, in turn, a plurality of input stations 108 may be connected. In the embodiment of FIG. 1, the input point 108 may be a material input point extending upwardly from the level of a surface s.

Material input points 108 may be arranged to the material conveying pipe 100 or along its branch conveying pipes 101, 102. The system may comprise a plurality of input points 108 from which material intended to be transported may be fed to the conveying piping. In the input point 108 there may be an input container which may be connectable to the branch conveying pipe 101. The material may be fed through an input aperture 31 of the input point for being conducted to the material conveying pipe 100. The input aperture 31 of the input point may comprise an openable and closable hatch. Between the input container of the input point and the branch conveying pipe there may be a valve member. By opening and closing the valve member, material may be conveyed from the input point to the conveying pipe. The input point 108 may thus be connected to the branch conveying pipe 101, 102 and further to the material conveying pipe 100. One or a plurality of input points 108 may be connected to the branch conveying pipe 101, 102. The conveying pipe and/or the branch conveying pipe and/or the input point may be provided with means for allowing and preventing an access of replacement air to the material conveying pipe. According to one embodiment, the means for allowing and preventing the access of replacement air may comprise a replacement air coupling or an aperture which may be provided with a replacement air valve by means of which the access of replacement air to the conveying pipe may be controlled. A noise reducer and/or a filter device may be arranged in connection with the replacement air coupling 110 or the aperture.

The replacement air needed for emptying the input container of the input point 108 may come via the input point. According to one embodiment, a separate replacement air coupling with a replacement air valve 30 may be provided in connection with the input point.

According to one embodiment, the input point 108 may be connected via an input channel to a material shaper (not illustrated), which may shape and compact the material to fit in conveying piping that is smaller in diameter than the input channel. A solution according to one embodiment may also be suitable for material conveying systems in which material shapers are not used, but material is conveyed from the input points directly to the conveying piping. The conveying piping may be arranged below the level of the surface s.

In the embodiment of FIG. 1, in the conveying piping there may be a replacement air coupling 110 which may be provided with a replacement air valve 109 for controlling an access of replacement air and for providing a transporting air flow in the conveying pipe together with suction provided by the partial-vacuum generator 121A, 121B. The conveying system may comprise one or more containers and/or material separators to which the material being conveyed is conducted in the conveying pipe by means of a pressure difference and/or a transporting air flow. In the embodiment of FIG. 1, a separator container 90A, 90B may be arranged at an outlet end of the material conveying pipe 100, in which separator container the material being conveyed is separated from the transporting air and remains in the container of the separator device. The conveying pipe may be provided with a valve member 111 or a plurality of valve members, under the control of the position of which valve members a connection 105A, 105B may be opened from the conveying pipe to the separator container 90A, 90B. According to one embodiment, the valve member 111 may be a multiple-way valve or an arrangement of multiple valves by which a connection from the conveying pipe 100 to a desired separator container 90A, 90B may be enabled. From the suction side of the partial-vacuum generator 121A, 122B, a connection 119A, 119B, 118, 117, 116, 115A, 115B may be provided to the separator container 90A, 90B, and further to the conveying pipe 100.

The material conveying system may comprise a second material conveying arrangement which may comprise a second separator device 10. The second separator device 10 may comprise a container 11 inside which a container space is formed. The second separator device 10 may comprise a material and transporting air input aperture 14' as well as a transporting air output aperture 16' in communication with the container space. The second separator device may further comprise a material output aperture 6.

According to one embodiment, the second separator device 10 may be a combination of a material deep collection container which is formed of an external container 12 and a collection container 11, and means separating the transporting air and the material being conveyed from each other arranged therein. The second separator device 10 may according to one embodiment be a so-called cyclone separator.

According to one embodiment, the second material conveying arrangement may further comprise at least one second input point 200. The at least one second input point 200 may comprise an input aperture 231 for feeding material into an input container of the second input point 200. The input aperture 231 may be arranged to be covered by an openable and closable hatch. The hatch of the input aperture may be opened and closed in order to feed material through the input aperture for being transported further in a conveying pipe. An input container may be provided in connection with the input point. The material may collect into the input container of the input point. From the second input point 200 there may be, for example from its lower part, a connection to a second material conveying pipe 201. According to one embodiment, the connection to the conveying pipe may be arranged from the input container of the input point. A valve may be provided between the input point and the conveying pipe. In an open position of the valve, material may be conveyed from the second input point 200 to the second conveying pipe 201. From the second material conveying pipe 201, a material pathway 202, 14 to the input aperture 14' of the second separator device 10 and further to the container space of the collection container 11 of the second separator device 10 may be provided. According to one embodiment, the material pathway may comprise a conveying pipe section 202 and an input coupling 14. According to one embodiment, the input coupling 14 may be connected to the input aperture 14' formed in the wall of the collection container 11 of the second separator device 10. According to one embodiment, the input coupling 14 and the conveying pipe section 202 may be of the same piece. According to one embodiment, the conveying pipe section may be designed to be curved, wherein its end facing the conveying pipe 201 (input side) may be vertical and its end facing the container 11 may be horizontal. The pipe may form an angle of 90 degrees between the input end and the end facing the container.

According to one embodiment, the material conveying pipe 201 may be connectable to the collection container 11 of the second separator device 10. The material M being transported may be separated in the second separator device 10 from transporting air. A connection member 201' may be formed in the conveying pipe 201 and a counterpart may be formed in the material pathway leading into the collection container 11, in the conveying pipe section 202 or in the coupling 14. The connection member 201' and the counterpart may together form a connection, for example a quick connection. According to one embodiment, the connection member 201' may be a sleeve part to which the counterpart of the material pathway 202 leading into the collection container, such as the free end may be fitted. According to one embodiment, the connection part 201' and the counterpart of the medium pathway of the container may be arranged in alignment when the container part 11 is placed in the external container.

A second connection member 204' may be formed in a transporting air output coupling 16 arranged in the collection container 11 or in a medium pathway 203, 204. The output coupling 16 of the collection container or the medium pathway 203 may be provided with a counterpart which may be arranged together with the second connection member 204' to form a connection, for example a quick connection. According to one embodiment, the connection member 204' may be a sleeve part to which the counterpart of the material pathway 203 leading into the collection container, such as the free end may be fitted. According to one embodiment, the connection part 204' and the counterpart of the medium pathway of the container may be arranged in alignment when the container part 11 is placed in the external container.

According to one embodiment, the output coupling 16 and the medium pathway section 203 may be of the same piece. According to one embodiment, the output coupling or the medium pathway 203 may be designed to be curved, wherein its end facing the pipe 204 (output side) may be vertical and its end facing the container 11 may be horizontal. The pipe 203 forming the medium pathway may form an angle of 90 degrees between the input end and the end facing the container.

A pipe or hose coming from a partial-vacuum source, such as from the partial-vacuum source 121A, 121B of the first material conveying system, may be operatively connected to the output aperture 16 of the second separator device 10, via which pipe or hose the negative pressure needed for the second material conveying arrangement may be caused to act in the second separator device 10 and further in the second conveying pipe 201. The transporting air flow needed for material transfer may be conducted via the output aperture 14' of the second separator device from the collection container.

The separator device 10 may thus comprise in one embodiment an external container 12 and a collection container 11. The external container 12 may be, like for example in the embodiments of FIG. 1-8, a recess or container provided in the ground or soil, which recess or container may have a base 5 and a side wall 4. The external container 12 may extend from the surface level s to a distance in the downward direction. A separate collection container 11 may be arranged in the external container 12, which collection container arranged to fit in the external container 12. According to one embodiment, an upper part of the collection container 11 may extend above the surface level S.

According to one embodiment, the collection container 11 of the separator device 10 may be a so-called cyclone separator in which there is a container space defined by side walls 11', 11", a bottom hatch 7 and an upper end wall 8. According to one embodiment, the container space of the container 11 may be mainly cylindrical from an upper part 11' thereof. The container space may be in the shape of a truncated cone from a lower part thereof, which becomes conically smaller in the lower part 11" towards the base where there may be an output aperture 6 and a hatch 7 opening and closing it. According to one embodiment, the hatch 7 may be arranged in a pivotable manner, for example by a hinge member 7', to the wall of the container 11. An input coupling 14 may be connected to the wall of the collection container 11 of the separator device, in the upper part 11' thereof, via which input coupling the material M being transported, together with the transporting air may be conducted to the container space of the separating device through the input aperture 14'. According to one embodiment, the input aperture 14' may be arranged in the wall of the chamber space of the separating container, in the upper part of the side wall thereof.

According to one embodiment, the input aperture 14' of the input coupling 14 into the collection container 11 may be arranged in the wall of the separator device in the upper part 11' thereof, in an area between the end wall 8 and a lower part of a wall 13 extending from the upper end wall 8 to the interior of the separating device. According to one embodiment, the wall 13 may be cylindrical. In the separator device 10 in the collection container 11 there may be an annular portion in said area, wherein the wall 13 may form the inner circle of the annular portion and the wall 11' of the collection container, typically the upper part of the wall, may form the outer circle of the annular portion. The wall 13 may form in an upper part of the container space of the separator device a channel which is open from the side facing the cylindrical container space, i.e. from below in FIG. 2. The channel formed by the wall 13 may be arranged concentrically (coaxially) with the vertical axis of the container space.

According to one embodiment, the input coupling 14 and the input aperture 14' may be arranged to the wall 11' of the collection container 11 in a mainly tangential direction relative to the wall of the collection container 11. According to one embodiment, the transporting air a and the material M may be fed through the input aperture 14' to the annular space portion between the wall 13 and the wall of the container space, in the upper part of the container space.

Figures 2, 3A, 3B:
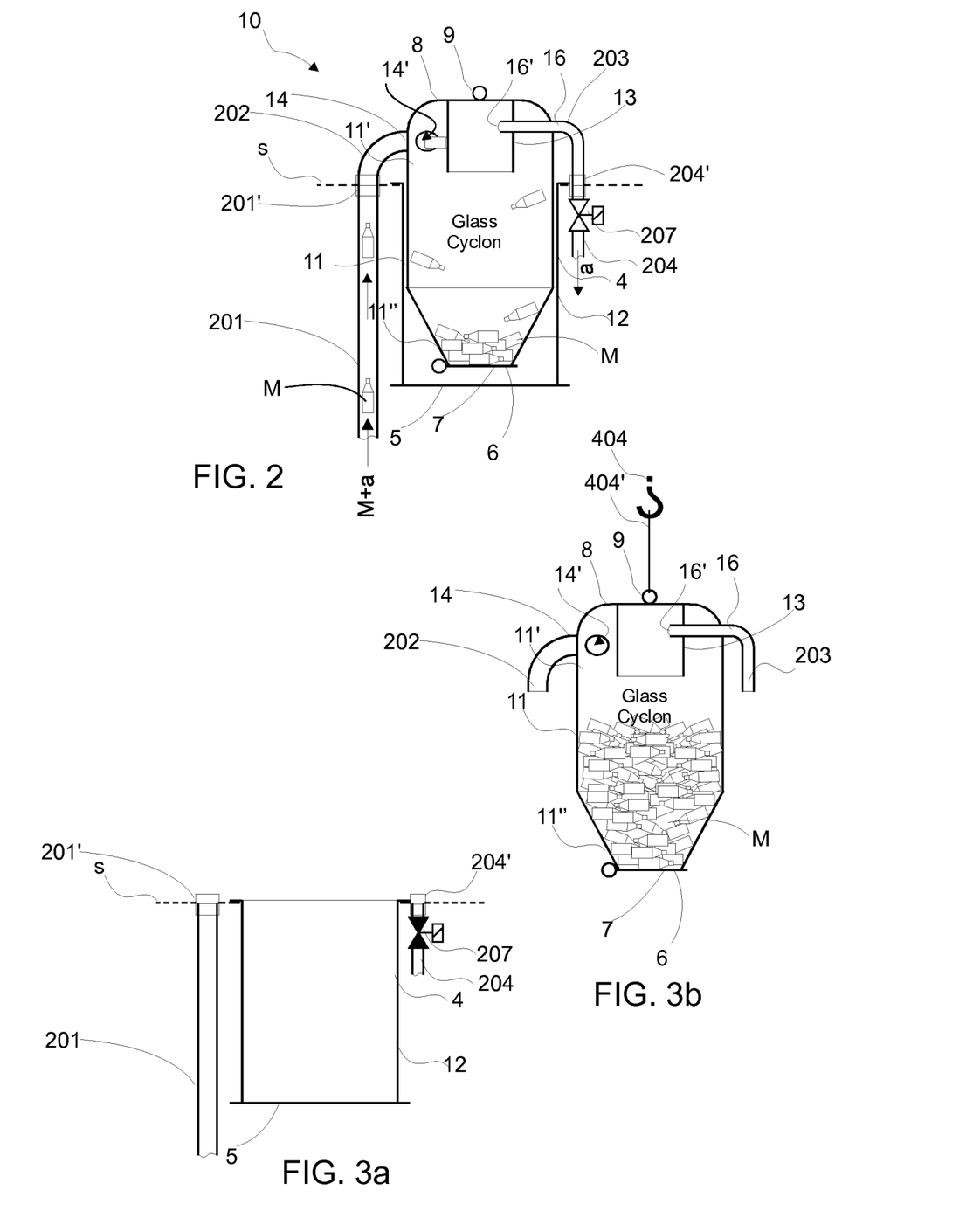
FIG. 2 illustrates an embodiment of a separating device according to one embodiment as a simplified diagram partly cut in a vertical plane in a collection container filling mode.
FIG. 3a illustrates an embodiment of an external container of a separating device according to one embodiment as a simplified diagram partly cut in a vertical plane without a collection container.
FIG. 3b illustrates an embodiment of a collection container of a separating device according to one embodiment as a simplified diagram partly cut in a vertical plane.

In one embodiment, the material M separated from transporting air, such as glass material, moves by the effect of gravity to a lower part of the collection container 11. FIG. 2 illustrates the movement of the separated material M to the lower part of the collection container 11 of the separating device 10. In one embodiment, the material M may be glass material, for example collected waste glass, such as glass bottles and glass jars. The separated material may be removed from the collection container, for example as needed.

Figure 8:
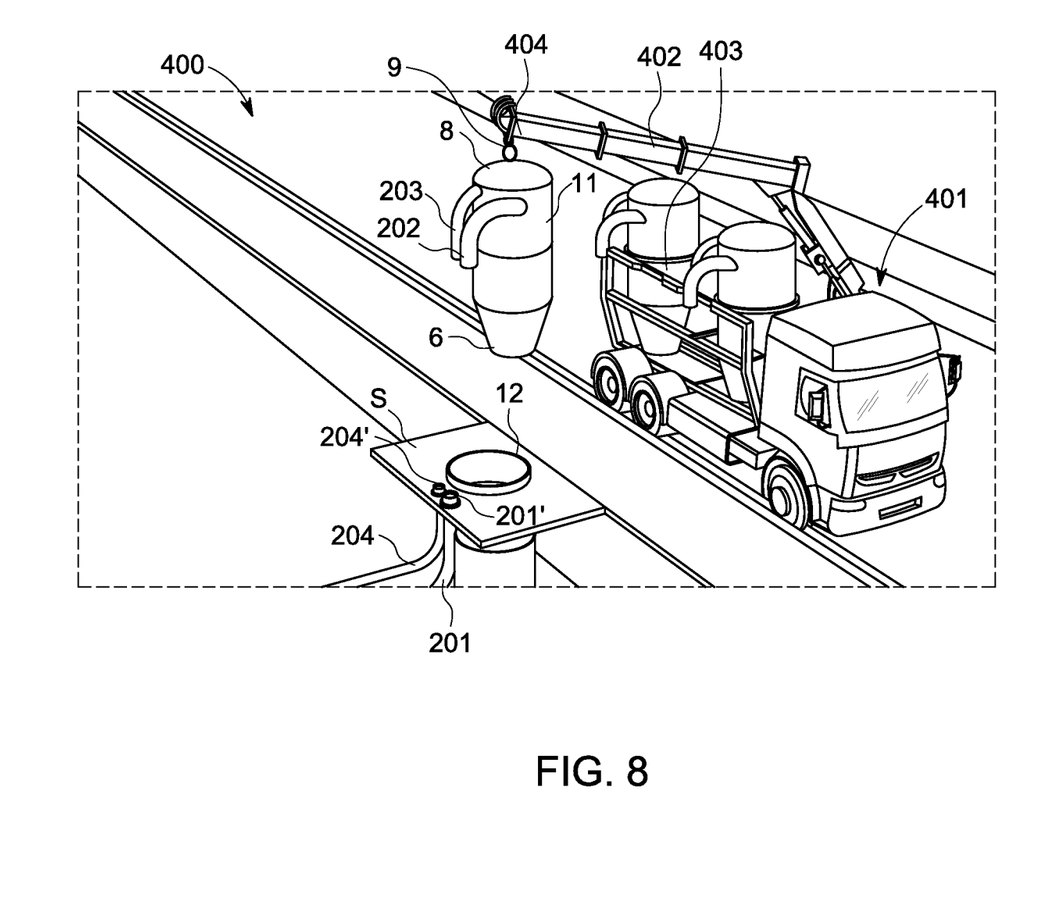
FIG. 8 illustrates a material conveying arrangement according to an embodiment at an application site, partly cut and with part of a ground structure removed to illustrate underground parts, in a third operating mode.

In a material removal stage, the collection container 11 may be lifted out from the external container 12 by lifting means 404, 404', for example from a lifting lug 9. The lifting device may be for example a lifter 402 of a transporting vehicle. The material may be discharged into a container 405 of a transporting vehicle 401, such as a waste collection vehicle. The material may be discharged, for example via the material output aperture 6 arranged in the lower part of the collection container 11, for example by opening the hatch 7 closing the output aperture 6. The filled-up container 11 may also be replaced by an empty container, and the filled-up container 11 may be transported by the transporting vehicle 401 to another location for being emptied (FIG. 8).

The transporting air flow a may be conducted from the separator device 10 through the output aperture 16', and further via the output coupling 16. The transporting air is typically deflected in the separator device 10, whereby the heavier material coming in with the transporting air separates more easily from the transporting air.

In the embodiments of FIGS. 1, 2, 3a, 4 and 6, the upper part of the collection container 11 of the separating device 10 may be provided with a wall part 13 extending to the chamber space of the separating device. According to one embodiment, the wall part 13 may be cylindrical. The wall part may be coaxial with the vertical axis of the collection container 11 of the separator device. An output channel may be arranged inside the circumference of the wall part 13, which output channel is accessed through an opening of a lower part of the wall 13. From an upper part of the output channel there may be via the output aperture 16' a connection to the transporting air output coupling 16.

According to one embodiment, in the embodiment a lower end of the cylindrical wall part 13 may thus be open. The output coupling 16 may be arranged in the collection container 11 of the separator device in such a way that the transporting air is removed in a mainly tangential direction relative to the wall part 13 from the upper part of the collection container 11.

A rotating or tangential motion may be provided for the transporting air being discharged in the output channel defined by the wall part 13, which motion is preferably opposite to the rotating or tangential motion of the transporting air (and the particles carried by it) (M+a) in the collection container 11 of the separating device, at least in the chamber space in the vicinity of the input coupling 14.

The rotating or tangential motion of the transporting air may be opposite to the direction of rotation of the rotating or tangential motion of the transporting air coming in to the separating device from the input coupling 14. Thereby the rotating motion of the transporting air coming from the chamber space of the collection container 11 may be neutralized in the output channel 13 or in the vicinity thereof and the velocity of the transporting air may slow down. According to one embodiment, by this procedure an easy ascent of possible harmful particles, such as paper and plastic, with the transporting air from the chamber space of the collection container 11 of the separating device to the output channel 13 may be prevented.

Figure 4:
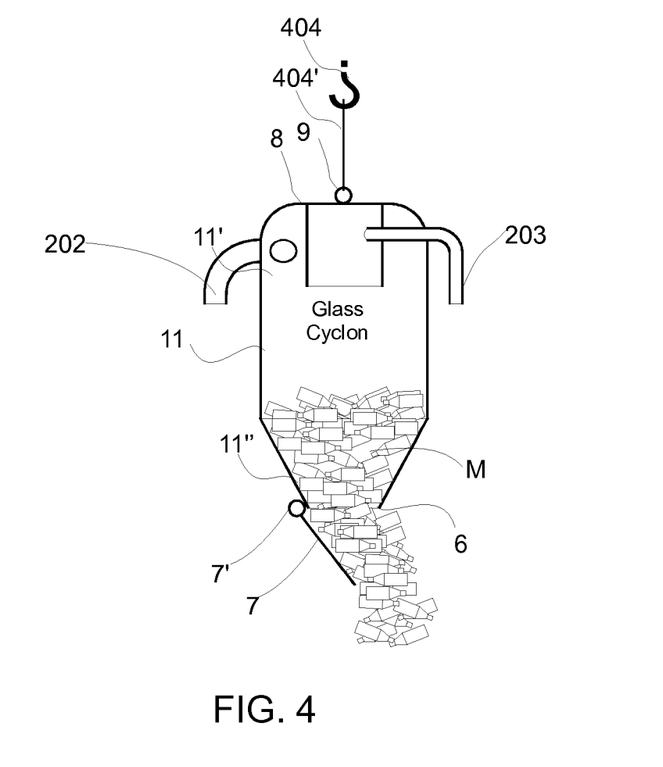
FIG. 4 illustrates an embodiment of a collection container of a separating device according to one embodiment as a simplified diagram partly cut in a vertical plane in an emptying mode.
Figure 5:
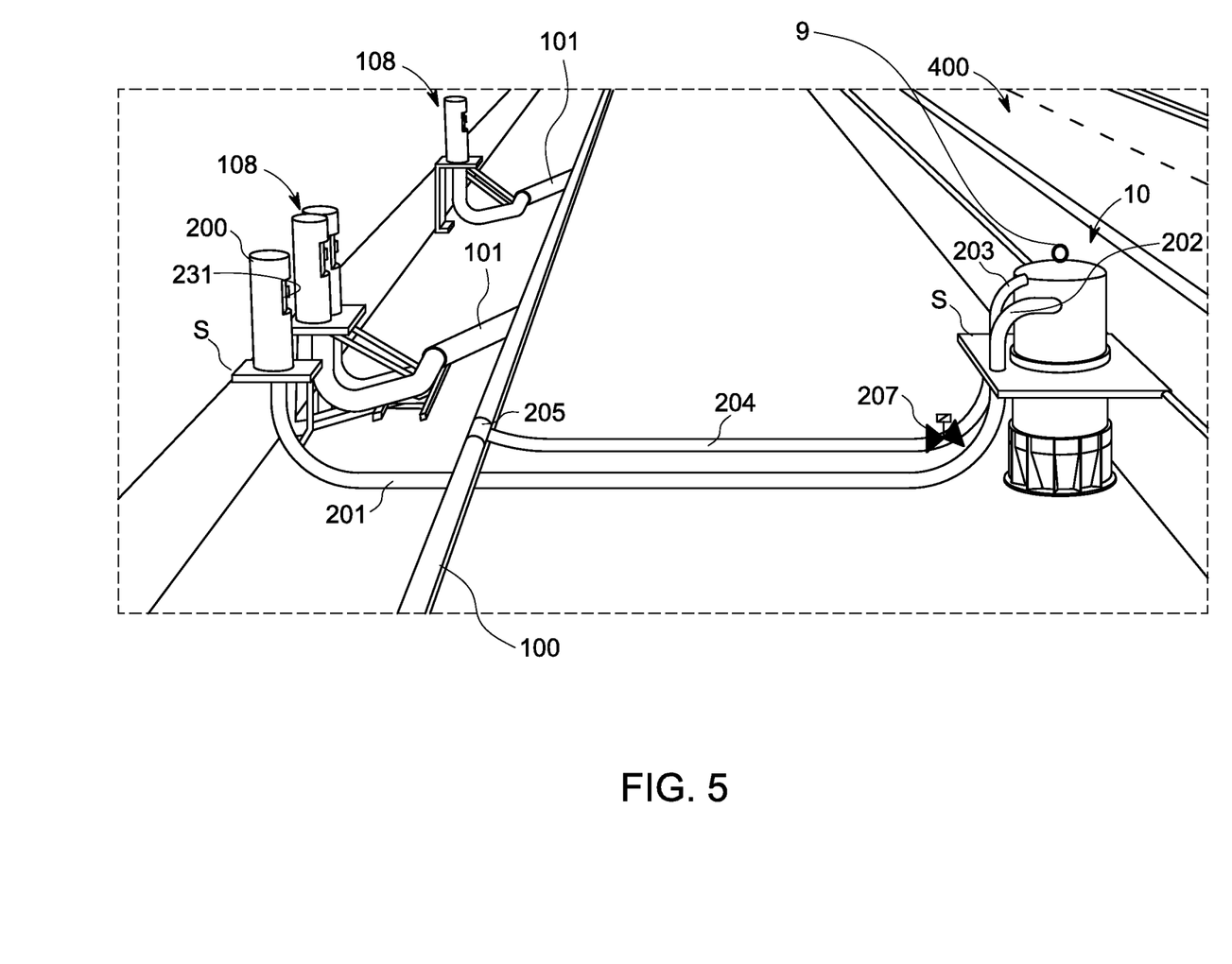
FIG. 5 illustrates a material conveying arrangement according to one embodiment at an application site with part of a ground structure removed to illustrate underground parts.
Figure 6:
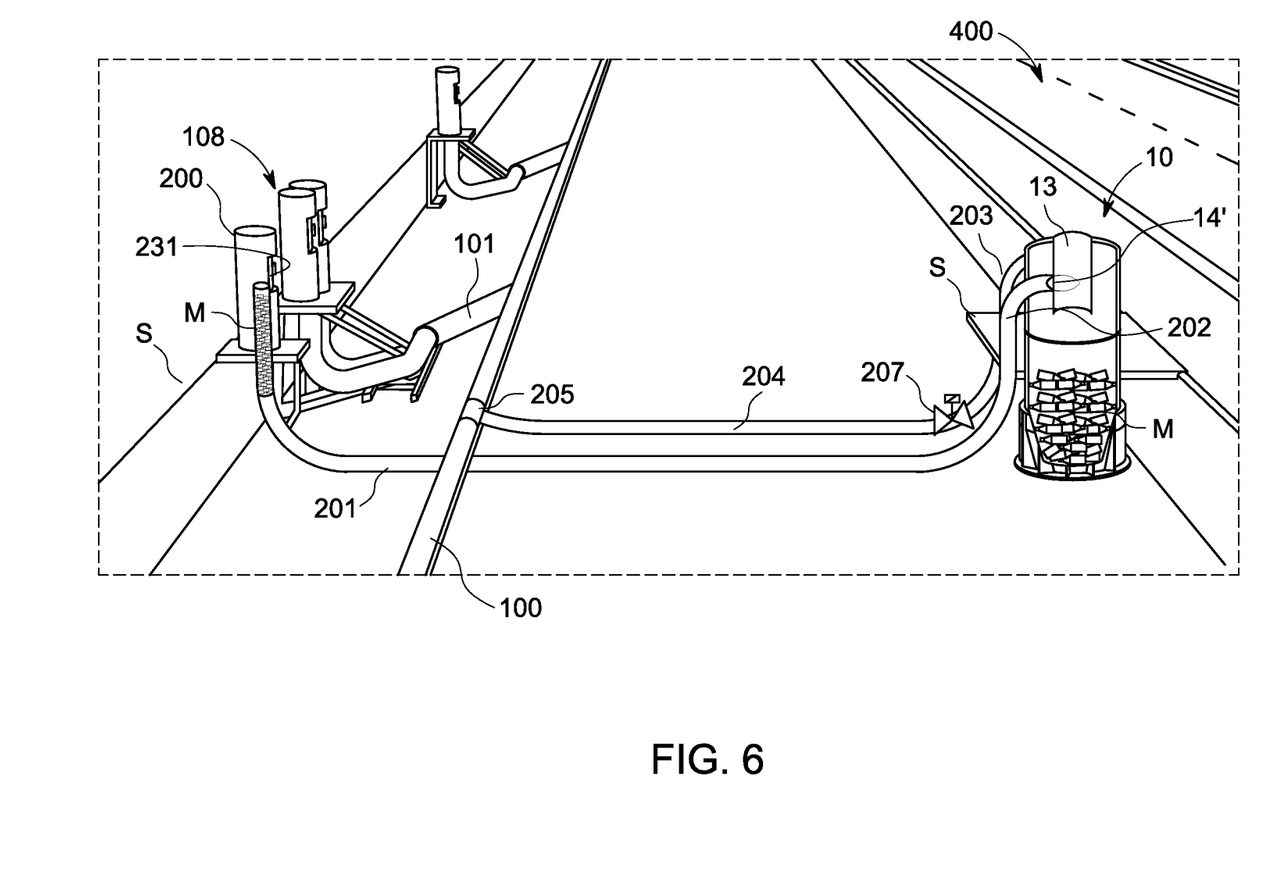
FIG. 6 illustrates a material conveying arrangement according to one embodiment at an application site, partly cut and with part of a ground structure removed to illustrate underground parts, in a first operating mode.

The collection container 11 may be lifted from the space of the external container 12 by lifting means. The upper wall 8 of the collection container 11 may be provided with a lifting lug 9 or a lifting ear or the like. FIGS. 3b and 4 illustrate an embodiment with a lifting hook 404 and a simplified lifting sling 404' by means of which, by a lifter 402 (FIG. 7, 8), the collection container 11 may be lifted from the external container 12.

The second separator device may be a so-called deep collection separator. The external container 12 of the deep collection container may be disposed below the surface S or a corresponding surface. The corresponding surface may be contemplated as including all planes from which material may be dropped into the container and correspondingly, from which emptying of the container may be performed. Walls 4 of the external container 12 may be comprised of a vertical container closed from below and open from the top. The external container may be metal, plastic, composite material, or other material. According to one embodiment, the external container may be steel, according to another embodiment the external container may be reinforced plastic. The collection container 11 and/or the external container 12 may be disposed in a hole made for it in such a way that most of the volume of the container is located below the surface S. In one embodiment, the side wall 4 of the external container 12 may continue above the surface S. In the embodiments of FIG. 2, 3a, the cross-sectional surface area of the external container 12 in the horizontal plane is constant, but it may be horizontally enlarging in the upward direction, whereby the external container is slightly conically widening in the upward direction.

Means for providing a pressure difference and/or a transporting air flow in the conveying pipe 100 may comprise at least one partial-vacuum generator 121A, 121B or pressure source or blower, providing suction or a pressure difference or a transporting air flow by means of which the material may be conveyed in the conveying pipe. In the embodiment of FIG. 1, the partial-vacuum generator 121A, 121B is arranged at the outlet end of the first material conveying system, for example at a waste station 300.

The partial-vacuum generator may comprise a pump unit with one, or more, partial-vacuum generators 121A, 121B, such as partial-vacuum pumps, and a drive device 122A, 122B driving them. The suction side of the partial-vacuum generator 121A, 121B may be in a first operating mode via the medium pathway 119A, 19B, 118, 117, 116, 115A, 115B and via the material separator/collection container 90A, 90B of the first material conveying system to the conveying pipe 100. Thereby the suction/pressure difference needed for material transfer for the material separator/collection container 90A, 90B and to the conveying piping 100, 101, 102 may be provided. Between the partial-vacuum source 121A, 121B and the collection container 90A, 90B the medium pathway may be provided with a particle separator and/or a filter device. On the blowing side of the partial-vacuum source 121A, 121B there may be an exhaust channel 124. The exhaust channel may be provided with a noise reducer.

The drive device 122A, 122B of the partial-vacuum source 121A, 121B is according to one embodiment an electric drive, for example an electric motor.

The material fed from the input points 108 of the first material conveying system may be transported along the conveying piping 100, 105A, 105B into the separator container 90A, 90B of the first system, in which separator container the material being transported is separated from the transporting air. Instead of a separator container, in one embodiment a separate separator device and a container connectable thereto may be used. A material press, i.e. a compactor, may be arranged in connection with the separator container.

The purpose of the second material conveying arrangement may be to transport a second material M. The second material M may be for example material that is not suitable, because of its properties or for other reasons, for being transported by the first material conveying system. The second material may be for example wearing, abrasive, material which may wear the components, specifically pipes, of the conveying system. According to one embodiment, the second material M may comprise glass material.

The second material may comprise for example glass intended to be recycled. The second material may comprise metal. The second material may comprise stone material. The second material may comprise ceramic material. The second material may comprise material breaking into smaller pieces in the transfer of the material. The second material may comprise material comprising sharp edges.

According to one embodiment, the components of the second material conveying arrangement may comprise material resistant to wearing, such as abrasion caused by the material being conveyed. According to one embodiment, the conveying pipe of the second material conveying arrangement Thus, the conveying pipe 100 of the first material conveying system may be provided with medium communication from a connection point 205 to the separator device 10 of the second arrangement, for example by a pipeline 204. As a negative pressure acts via the first conveying pipe 100 and the pipeline 204 and via the container space 11 of the separator device 10 in the second material conveying pipe 201 and further in the second input point 200, the second material M collected into the input container of the second input point 200 may be conveyed along the second material conveying pipe to the container space of the collection container 11 of the separator device 10 of the second material conveying arrangement. The transporting air may in turn be removed via the pipeline 204 to the first conveying pipe 100 and further via the separator devices 90A, 90B of the first material conveying system along a medium pathway to the blowing side of the partial-vacuum generator 121A, 121B and to an exhaust pipe 123. The advantage of the arrangement is that the second material M may be conveyed a shorter distance to its own separator device 10. The second separator device 10 or the collection container 11 thereof may be emptied independently of the emptying/replacement sequences of the separator devices of the first system.

In the embodiment of FIG. 1, a plurality of second material conveying arrangements with their own separator devices 10 and input points 200 may be arranged along the conveying pipe 100. According to one embodiment, the input point 200 of the second material conveying arrangement may be arranged beside, or in the vicinity of, the input point 108 of the first material conveying system (as in FIG. 5-7). According to another embodiment, the input point 200 of the second material may be arranged between two input points 108 of the first material conveying system. According to one embodiment, the distance between the second input point 200 and the separating device 10 may be 10-500 meters. According to one embodiment, the distance between the input point 108 of the first material conveying system and the separating device 90A, 90B may be 50-3000 meters. According to one embodiment, material which may be waste material or recyclable material, for example domestic waste, or industrial material may be conveyed by the first conveying system. According to one embodiment, the material may be household waste packed into bags. According to one embodiment, the pipe of the first conveying system may comprise plastic material, fibre material or composite material. According to one embodiment, a different material M may be conveyed by the second conveying arrangement than by the first conveying system. According to one embodiment, the second material M conveyed by the second conveying arrangement may be material of a higher density than the material conveyed by the first conveying system. According to one embodiment, the second material M conveyed by the second conveying arrangement may comprise metal. According to one embodiment, the second material M conveyed by the second conveying arrangement may comprise glass material. According to one embodiment, the second material M conveyed by the second conveying arrangement may comprise recyclable material. According to one embodiment, the second material M conveyed by the second conveying arrangement may comprise collected waste glass, for example glass bottles or glass jars. According to one embodiment, the second material M conveyed by the second conveying arrangement may comprise plastic. According to one embodiment, the second material M conveyed by the second conveying arrangement may comprise.

According to one embodiment, the separator device of the second conveying arrangement may be arranged along a route 400. FIG. 5-8 illustrate one such arrangement. The figures show the underground parts of the arrangement, which parts may normally be covered with a structure, for example a street structure or a green structure or another deck structure.

According to one embodiment, a transporting vehicle 401 may be arranged to pick up or empty the container of the separator device of the second conveying arrangement. The transporting vehicle 401 may comprise a lifting device 402. The lifting device 402 may comprise a lifting hook 404 or the like, which is arrangeable to a counterpart of the container 11, such as a lifting lug 9. According to one embodiment, the transporting vehicle may comprise a rack 403 (FIG. 8) in which the containers 11 of the separator device 10 may be arranged to be placed. This embodiment is specifically suitable for use in connection with such materials the discharging of which from the container in the vicinity of the place of use of the separator device may cause disturbing noise. According to one embodiment, the transporting vehicle may comprise a container space 405 (FIG. 7) to which the material M collected into the container 11 of the separator device may be discharged, for example by opening the hatch 7 covering the output aperture 6 of the container. The discharging may be performed as needed. The container 11 may be lifted by the lifting means 402, 404, 9 for example by the lifter 402 of the transporting vehicle 401 in such a way that the lower part of the container 11 and the discharge aperture 6 thereof may be arranged in alignment with the filling aperture of the container 405 of the transporting vehicle. When the hatch 7 covering the discharge aperture 6 of the collection container is opened, the material may move from the container 11 into the container 405 of the transporting vehicle.

By arranging in connection with a first material conveying system a second material conveying arrangement utilizing the suction/negative pressure of a partial-vacuum generator of the first material conveying system, but wherein the material being transported is conducted from an input point along a separate conveying pipe to its own separating device into a container thereof, it is possible to provide an efficient solution for the transfer and collection of a second material. According to one embodiment, the components of the second waste conveying arrangement may be better adapted in terms of their properties to the properties of the material conveyed in the second material conveying arrangement.

The suction side of the partial-vacuum generator 121A, 121B of the first material conveying system may be connected to act via the first conveying pipe 100, the connection 205 arranged in the conveying pipe, in the transporting air channel 204 from which there may be, when a valve member 207 is disposed in an open position, a connection to the container to which in turn the outlet end of the second conveying pipe 201 may be connected, a negative pressure may be provided in the second conveying pipe 201. Thereby suction may act in the second conveying pipe 201 via a medium pathway connected to the container 11. The second input point 200 or the second conveying pipe 201 may be provided with a valve 30, 230 for opening and/or closing and/or controlling the input of replacement air.

Between the main conveying pipe 100 and a branch conveying pipe 101A and the input point 108 there is a feed valve 104 which is open in this operating mode. Thereby suction is able to act in an input channel 106 of the input point 108 and in a possible shaper device 105. Thereby a material batch intended to be conveyed is conveyed to the branch conveying pipe 101A and further to the main conveying pipe 100. Possible replacement air to the conveying pipe comes for example via the input point 108 when the valve 104 to the conveying pipe is opened. When the valve 104 of the input point is closed, the valve 109 of the replacement air channel 102 may be opened to provide replacement air to the conveying pipe 101A, 100.

The waste material moves along the conveying piping 101A, 100 into the container 11 in which the transporting air is separated from the waste material and the waste material remains in the collection container 11.

Next, other input points 108 are emptied as needed according to an emptying order or as needed.

The collection container 11 may be arranged according to FIG. 2 in the space defined by the walls 4,5 of the external container 12. When the connection 201' between the input coupling 202, 14 and the conveying pipe 201 is opened and correspondingly the connection 204' between the output coupling 16 and the pipeline 204 coming from the partial-vacuum source is opened, the collection container 11 may be lifted by the lifting means 9, 404', 404 from the external container 12 which is open from the top for being emptied. FIG. 3a illustrates the external container without the collection container 11.

In order to feed large-sized waste not fitting in the conveying piping, a filling aperture may be provided in the collection container 11, for example in the upper part of the container. The filling aperture of the collection container may be provided with a hatch.

Figure 7:
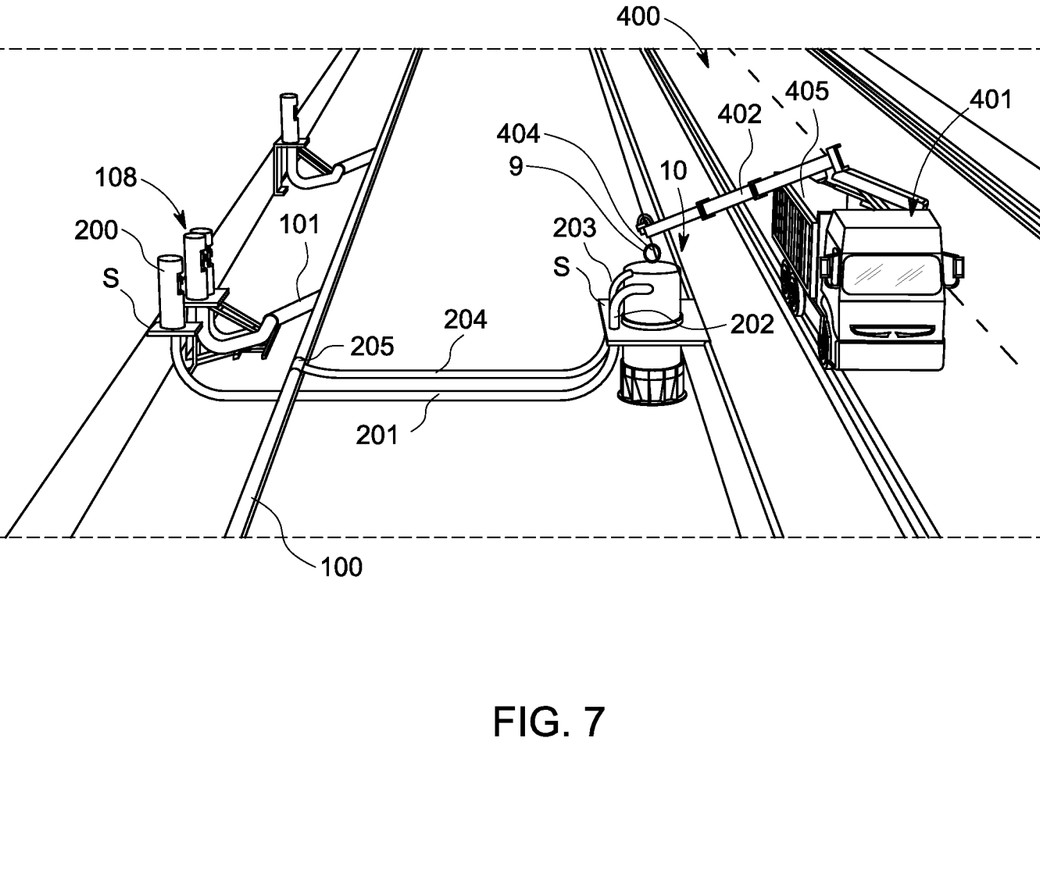
FIG. 7 illustrates a material conveying arrangement according to an embodiment at an application site, partly cut and with part of a ground structure removed to illustrate underground parts, in a second operating mode.

FIG. 7 illustrates a collection container emptying stage.

In the embodiment of FIG. 1-8, the collection container 11 of the separator device has in the upper part an upper wall 8. According to one embodiment, the transition zone between the upper wall 8 and the side wall 11, along which transition zone the upper wall connects to the side wall, may be curved. According to one embodiment, an input opening with an openable and closable hatch may be formed in the upper wall for feeding material directly into the collection container. The upper wall 8 may be provided for lifting with lifting means, such as a lifting lug 9, to which a lifting sling, wire or chain 404" may be fastened and then lifted by the lifting hook 404 of the lifting device. The embodiment of FIG. 1-8 is illustrated with one lifting lug 9, but there may be multiple lugs.

According to one embodiment, in the deep collection container the depth of the external container 12 of the separator device 10 according to the invention from the ground surface s may be approximately 3 meters and the diameter of the external container 12 may be approximately 2 meters. The diameter may naturally vary according to application for example 1000-3000 mm. The placement depth of the external container, i.e. the distance of the base of the container from the ground surface S, may vary according to application for example 2000-4000 mm. If the collection container 11 is according to the invention a deep collection container, the material M collected into the container (depending on the material) may compact tighter in the container as the amount of material in the container increases. Thus, it is possible to save space. The separator device may be arranged to be suitable for the surroundings and the emptying or replacement thereof goes smoothly, especially as it may be easily arranged in a desired location.

According to one embodiment, the material input points 108, 200 may be input points of waste material or recyclable material, such as waste bins or waste chutes.

It is obvious to a person skilled in the art that the invention is not limited to the embodiments set forth above, but may be varied within the scope of the accompanying claims. The features possibly presented in the description in combination with other features may also be used separately, if necessary.

The invention claimed is:

1. A method comprising:
    conveying material in a conveying pipe pneumatically by means of suction, a pressure difference or a transporting air flow in a material conveying system, the material conveying system comprising a first input point for feeding a first material, a first conveying pipe, at least one first separator device at an outlet end of the material conveying pipe as well as a partial-vacuum generator, wherein a suction side is connectable via the first separator device to the first conveying pipe, as well as means for opening and closing an access of replacement air to the first conveying pipe, for conveying the material from at least one first input point in the first conveying pipe, to the first separator device, wherein a negative pressure or the pressure difference relative to surrounding pressure is provided by the partial-vacuum generator, whereby a second material conveying arrangement is provided,
    wherein the second material conveying arrangement comprises at least one second input point for feeding a second material, a second separator device, a second conveying pipe between the at least one second input point and the second separator device, wherein the separator device of the second material conveying arrangement is operatively connected into medium communication with the first conveying pipe to connect the suction or pressure difference acting in a first pipe-line to act via the second separator device in the second conveying pipe, whereby the second material is conveyed from the at least one second input point in the second conveying pipe to the second separator device where the second material is separated from transporting air flow, and the second material is collected into a collection container of the second separator device.

2. The method according to claim 1, wherein the second separator device of the second conveying arrangement comprises the collection container and a material and transporting air input aperture, wherein the air input aperture is operatively connected by the second conveying pipe to the at least one second input point to convey the material in the second conveying pipe from the input point into the collection container of the second separator device together with the trans-porting air flow, when an operative medium communication is formed from a transporting air output aperture of the separator device by a pipe-line with the first conveying pipe to connect the suction or pressure difference acting in a first conveying pipe to act via the second separator device in the second conveying pipe, whereby the second material is conveyed from the at least one second input point in the second conveying pipe to the second separator device where the material is separated from trans-porting air flow, when access of replacement air to the second conveying pipe to an opposite side of the material being conveyed as seen from the second separator device in the direction of travel of the material is allowed.

3. The method according to claim 1, wherein the first material is conveyed in the first conveying pipe from the first input point arranged directly or via a branch line along the pipe to the first conveying pipe and further to the at least one separator device arranged at an outlet end of the first conveying pipe, wherein the at least one separator device separates the first material from the transporting air flow.

4. The method according to claim 1, wherein the at least one second input point or the second conveying pipe includes with a valve for opening and/or closing and/or controlling the input of replacement air.

5. The method according to claim 1, wherein the medium communication between the first conveying pipe and the second separator device is opened and closed by a valve.

6. The method according to claim 1, wherein an abrasive, wear-causing, second material is conveyed from the at least one second input point in the second conveying pipe.

7. The method according to claim 1, wherein the second material has different properties than the first material conveyed from the first input point in the first conveying pipe, and is conveyed from the at least one second input point.

8. The method according to claim 1, wherein the second conveying pipe comprises a different material than the first conveying pipe.

9. The method according to claim 1, wherein the second conveying pipe comprises wear-resistant material.

10. The method according to claim 1, wherein the collection container of the second separator device is a deep collection container.

11. The method according to claim 1, wherein the material collected into the collection container of the second separator device is discharged into a container of a transporting vehicle or the container filled with the material is replaced by an empty collection container and the container filled with the material is taken by the transporting vehicle to another location for being emptied.

12. The method according to claim 1, wherein the second separator device is a cyclone separator in its operating principle.

13. The method according to claim 1, wherein the second separator device is a deep collection container-separator device, wherein the collection container may be lifted by lifting means and the material collected into the collection container is discharged via an openable and closable aperture arranged in its lower part.

14. An arrangement for a pneumatic material conveying system comprising:
a first material conveying system comprising:
at least one first input point for feeding a first material,
a first conveying pipe,
at least one first separator device at an outlet end of the first conveying pipe, and
a partial-vacuum generator,
wherein a suction side of the partial-vacuum generator is connectable via the first separator device to the first conveying pipe as well as means for opening and closing an access of replacement air to the conveying pipe, for conveying material from the at least one first input point in the first conveying pipe, to the first separator device, wherein a negative pressure or a pressure difference relative to surrounding pressure is provided by the partial-vacuum generator; and
a second material conveying arrangement comprising:
at least one second input point for feeding a second material,
a second separator device, and
a second conveying pipe between the at least one second input point and the second separator device,
wherein the second separator device is operatively connectable into medium communication with the conveying pipe of the first material conveying system along the pipe, to connect a suction or the pressure difference acting in a first conveying pipe to act via the second separator device in the second conveying pipe to convey the second material from the at least one second input point in the second conveying pipe to the second separator device configured to separate the second material from transporting air flow, and to collect the material into a collection container of the second separator device.

15. The arrangement according to claim 14, wherein a pipeline is arranged from an output side of the second separator device to the first conveying pipe and wherein the second separator device is connectable from an input side by the second conveying pipe to the at least one second input point.

16. The arrangement according to claim 14, wherein the first input point and the at least one second input point and the first conveying pipe includes a replacement air channel and a valve for opening and closing and controlling the input of replacement air.

17. The arrangement according to claim 14, wherein the at least one second input point is configured to receive and/or the second conveying pipe is configured to convey and/or the separator device is configured to receive abrasive, wear-causing, second material.

18. The arrangement according to claim 14, wherein the second conveying pipe comprises a different material than the first conveying pipe.

19. The arrangement according to claim 14, wherein the second conveying pipe comprises wear-resistant material.

20. The arrangement according to claim 14, wherein the second separator device comprises a deep collection container.

21. The arrangement according to claim 14, wherein the second separator device is a cyclone separator in its operating principle.

22. The arrangement according to claim 14, wherein the second separator device is a deep collection container-separator device, wherein a collection container comprises a lifting point from which the collection container is arranged to be lifted by lifting means, and the collection container comprises an openable and closable aperture, via which the collection container may be emptied of collected material.

23. The arrangement according to claim 14, whereby the arrangement comprises a valve for opening and closing a medium communication between the first conveying pipe and the second separator device.

24. The arrangement according to claim 14, wherein a plurality of second separator devices and the at least one second input point connected thereto by the second conveying pipes are operatively connected along the first conveying pipe.

25. The arrangement according to claim 14, wherein the first conveying pipe is operatively connected with other components or subsystems utilizing suction of the first partial-vacuum generator acting via the first conveying pipe.

26. A material conveying system comprising:
a first material conveying system comprising:
at least one first input point for feeding a first material,
a first conveying pipe,
at least one first separator device at an outlet end of the first conveying pipe, and
a partial-vacuum generator,
wherein a suction side of the partial-vacuum generator is connectable via the first separator device to the first conveying pipe as well as means for opening and closing an access of replacement air to the conveying pipe, for conveying material from the at least one first input point in the first conveying pipe, to the first separator device, in which conveying pipe a negative pressure or a pressure difference relative to surrounding pressure is provided by the partial-vacuum generator; and
a second material conveying arrangement comprising:
at least one second input point for feeding a second material,
a second separator device, and
a second conveying pipe between the at least one second input point and the second separator device,
wherein the second separator device is operatively connectable into medium communication with the conveying pipe of the first material conveying system along the pipe, in order to connect a suction or the pressure difference acting in a first conveying pipe to act via the second separator device in the second conveying pipe to convey the second material from the at least one second input point in the second conveying pipe to the second separator device configured to separate the second material from transporting air flow, and to collect the material into a collection container of the second separator device, and wherein at least one of industrial materials, domestic waste, recyclable material is conveyed by one of the first material conveying system or the second material conveying arrangement.

\* \* \* \* \*